United States Patent
Akutagawa

(10) Patent No.: US 9,191,952 B2
(45) Date of Patent: Nov. 17, 2015

(54) WIRELESS COMMUNICATION DEVICE, WIRELESS COMMUNICATION METHOD, AND WIRELESS COMMUNICATION SYSTEM

(71) Applicant: FUJITSU LIMITED, Kawasaki-shi, Kanagawa (JP)

(72) Inventor: Takeshi Akutagawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 115 days.

(21) Appl. No.: 13/966,815

(22) Filed: Aug. 14, 2013

(65) Prior Publication Data

US 2014/0119296 A1    May 1, 2014

(30) Foreign Application Priority Data

Nov. 1, 2012    (JP) ................................. 2012-241698

(51) Int. Cl.
*H04W 4/00* (2009.01)
*H04W 72/04* (2009.01)
*H04B 1/04* (2006.01)
*H04B 1/00* (2006.01)

(52) U.S. Cl.
CPC ......... *H04W 72/0453* (2013.01); *H04B 1/0475* (2013.01); *H04B 1/005* (2013.01)

(58) Field of Classification Search
CPC .......... H04L 27/2614; H04L 27/2636; H04W 52/42; H04W 72/0453
See application file for complete search history.

(56) References Cited

U.S. PATENT DOCUMENTS

| 8,184,678 | B2* | 5/2012 | McHenry ...................... 375/219 |
| 8,203,987 | B2* | 6/2012 | Ishii et al. ...................... 370/311 |
| 2009/0160549 | A1 | 6/2009 | O'Flaherty et al. | |
| 2012/0044898 | A1* | 2/2012 | Ishii .............................. 370/329 |
| 2012/0201330 | A1* | 8/2012 | McHenry ...................... 375/297 |
| 2012/0258762 | A1 | 10/2012 | Goto et al. | |
| 2013/0083767 | A1* | 4/2013 | Goto et al. .................... 370/329 |
| 2014/0286360 | A1* | 9/2014 | McHenry ...................... 370/537 |
| 2015/0011233 | A1* | 1/2015 | Kazmi et al. .................. 455/454 |

FOREIGN PATENT DOCUMENTS

| JP | 2002-317942 A | 10/2002 |
| JP | 2004-288201 A | 10/2004 |
| JP | 2011-507444 A | 3/2011 |
| JP | 2011-097367 A | 5/2011 |

* cited by examiner

*Primary Examiner* — Brian O'Connor
(74) *Attorney, Agent, or Firm* — Arent Fox LLP

(57) ABSTRACT

A wireless communication device includes a first generator and a plurality of adders. The first generator is configured to generate a first cancellation signal having inverse characteristics of a first spurious emission that is expected to occur between transmission signals in a plurality of frequency bands during data transmission using the plurality of frequency bands, based on information regarding the plurality of frequency bands. The plurality of adders is configured to add the first cancellation signal to transmission signals in the plurality of frequency bands.

14 Claims, 17 Drawing Sheets

| A2 | TX_carrier | 1940 |
|----|------------|------|
| B2 | TX_RB TRANSMISSION FREQUENCY | 1921 |
| C2 | RX | 2130 |
| D2 | Image | 1959 |
| E2 | Folder_Image | 1883 |
| F2 | CIMR3 | 1997 |
| G2 | CM4(a-(4*b)) | 1864 |
| H2 | CM5(a-(5*b)) | 1845 |
| I2 | 2TX | 3880 |
| J2 | 3TX | 5820 |
| K2 | TX+RX | 4070 |
| L2 | 2TX-RX | 1750 |
| M2 | RX-TX | 190 |
| N2 | (RX+TX)/2 | 2035 |
| O2 | 3TX-RX | 3690 |

SPURIOUS FREQUENCIES WITH 2.0-GHz BAND1, TX BAND 1920-1980 MHz, AND RX BAND 2110-2180 MHz

BAND5 BANDWIDTH=25 MHz

IN-BAND FREQUENCY RANGE 824-849 MHz

CHBW=20MHz
TRANSMISSION CH=835 MHz

NUMBER OF RBS: 8
ALLOCATED TRANSMISSION RB NUMBERS: 0-7

FIG. 6

| - | CC1 | CC2 | UNIT |
|---|---|---|---|
| FREQUENCY BAND INFORMATION | BAND5 | BAND1 | - |
| IN-BAND FREQUENCY RANGE | 824-849 | 1920-1960 | MHz |
| TRANSMISSION CH | 835 | 1930 | MHz |
| CHBW | 20 | 20 | MHz |
| NUMBER OF TRANSMISSION RBS | 8 | 100 | RB |
| ALLOCATED TRANSMISSION RB NUMBERS | 0-7 | 0-99 | RB |

| | | | |
|---|---|---|---|
| LOW TRANSMISSION FREQUENCY RANGE | 825 | 1920 | MHz |
| HIGH TRANSMISSION FREQUENCY RANGE | 826.44 | 1940 | MHz |

FIG. 7

| A1 | TX_carrier | 835 |
|----|------------|-----|
| B1 | TX_RB TRANSMISSION FREQUENCY | 825 |
| C1 | RX | 880 |
| D1 | Image | 854 |
| E1 | Folder_Image | 796 |
| F1 | CIMR3 | 892 |
| G1 | CM4(a-(4*b)) | 759 |
| H1 | CM5(a-(5*b)) | 740 |
| I1 | 2TX | 1670 |
| J1 | 3TX | 2505 |
| K1 | TX+RX | 1715 |
| L1 | 2TX-RX | 790 |
| M1 | RX-TX | 45 |
| N1 | (RX+TX)/2 | 857.5 |
| O1 | 3TX-RX | 1625 |

SPURIOUS FREQUENCIES WITH 800-MHz BAND5 AND TX-BAND 824-849 MHz

FIG. 8A

| CC_1 (MHz) \ CC_2 (MHz) | 1940 | 1921 | 2130 | 1959 | 1883 | 1997 | 1864 | 1845 | 3880 | 5820 | 4070 | 1750 | 190 | 2035 | 3690 |
|---|---|---|---|---|---|---|---|---|---|---|---|---|---|---|---|
| | A2 | B2 | C2 | D2 | E2 | F2 | G2 | H2 | I2 | J2 | K2 | L2 | M2 | N2 | O2 |
| 835 A1 | 2775 | 2756 | 2965 | 2794 | 2718 | 2832 | 2699 | 2680 | 4715 | 6655 | 4905 | 2585 | 1025 | 2870 | 4525 |
| 825 B1 | 2765 | 2746 | 2955 | 2784 | 2708 | 2822 | 2689 | 2670 | 4705 | 6645 | 4895 | 2575 | 1015 | 2860 | 4515 |
| 880 C1 | 2820 | 2801 | 3010 | 2839 | 2763 | 2877 | 2744 | 2725 | 4760 | 6700 | 4950 | 2630 | 1070 | 2915 | 4570 |
| 854 D1 | 2794 | 2775 | 2984 | 2813 | 2737 | 2851 | 2718 | 2699 | 4734 | 6674 | 4924 | 2604 | 1044 | 2889 | 4544 |
| 796 E1 | 2736 | 2717 | 2926 | 2755 | 2679 | 2793 | 2660 | 2641 | 4676 | 6616 | 4866 | 2546 | 986 | 2831 | 4486 |
| 892 F1 | 2832 | 2813 | 3022 | 2851 | 2775 | 2889 | 2756 | 2737 | 4772 | 6712 | 4962 | 2642 | 1082 | 2927 | 4582 |
| 759 G1 | 2699 | 2680 | 2889 | 2718 | 2642 | 2756 | 2623 | 2604 | 4639 | 6579 | 4829 | 2509 | 949 | 2794 | 4449 |
| 740 H1 | 2680 | 2661 | 2870 | 2699 | 2623 | 2737 | 2604 | 2585 | 4620 | 6560 | 4810 | 2490 | 930 | 2775 | 4430 |
| 1670 I1 | 3610 | 3591 | 3800 | 3629 | 3553 | 3667 | 3534 | 3515 | 5550 | 7490 | 5740 | 3420 | 1860 | 3705 | 5360 |
| 2505 J1 | 4445 | 4426 | 4635 | 4464 | 4388 | 4502 | 4369 | 4350 | 6385 | 8325 | 6575 | 4255 | 2695 | 4540 | 6195 |
| 1715 K1 | 3655 | 3636 | 3845 | 3674 | 3598 | 3712 | 3579 | 3560 | 5595 | 7535 | 5785 | 3465 | 1905 | 3750 | 5405 |
| 790 L1 | 2730 | 2711 | 2920 | 2749 | 2673 | 2787 | 2654 | 2635 | 4670 | 6610 | 4860 | 2540 | 980 | 2825 | 4480 |
| 45 M1 | 1985 | 1966 | 2175 | 2004 | 1928 | 2042 | 1909 | 1890 | 3925 | 5865 | 4115 | 1795 | 235 | 2080 | 3735 |
| 857.5 N1 | 2797.5 | 2778.5 | 2987.5 | 2816.5 | 2740.5 | 2854.5 | 2721.5 | 2702.5 | 4737.5 | 6677.5 | 4927.5 | 2607.5 | 1047.5 | 2892.5 | 4547.5 |
| 1625 O1 | 3565 | 3546 | 3755 | 3584 | 3508 | 3622 | 3489 | 3470 | 5505 | 7445 | 5695 | 3375 | 1815 | 3660 | 5315 |

FIG. 8B

| CC_1 (MHz) \ CC_2 (MHz) | 1940 | 1921 | 2130 | 1959 | 1883 | 1997 | 1864 | 1845 | 3880 | 5820 | 4070 | 1750 | 190 | 2035 | 3690 |
|---|---|---|---|---|---|---|---|---|---|---|---|---|---|---|---|
| | A2 | B2 | C2 | D2 | E2 | F2 | G2 | H2 | I2 | J2 | K2 | L2 | M2 | N2 | O2 |
| 835 A1 | 1105 | 1086 | 1295 | 1124 | 1048 | 1162 | 1029 | 1010 | 3045 | 4985 | 3235 | 915 | 645 | 1200 | 2855 |
| 825 B1 | 1115 | 1096 | 1305 | 1134 | 1058 | 1172 | 1039 | 1020 | 3055 | 4995 | 3245 | 925 | 635 | 1210 | 2865 |
| 880 C1 | 1060 | 1041 | 1250 | 1079 | 1003 | 1117 | 984 | 965 | 3000 | 4940 | 3190 | 870 | 690 | 1155 | 2810 |
| 854 D1 | 1086 | 1067 | 1276 | 1105 | 1029 | 1143 | 1010 | 991 | 3026 | 4966 | 3216 | 896 | 664 | 1181 | 2836 |
| 796 E1 | 1144 | 1125 | 1334 | 1163 | 1087 | 1201 | 1068 | 1049 | 3084 | 5024 | 3274 | 954 | 606 | 1239 | 2894 |
| 892 F1 | 1048 | 1029 | 1238 | 1067 | 991 | 1105 | 972 | 953 | 2988 | 4928 | 3178 | 858 | 702 | 1143 | 2798 |
| 759 G1 | 1181 | 1162 | 1371 | 1200 | 1124 | 1238 | 1105 | 1086 | 3121 | 5061 | 3311 | 991 | 569 | 1276 | 2931 |
| 740 H1 | 1200 | 1181 | 1390 | 1219 | 1143 | 1257 | 1124 | 1105 | 3140 | 5080 | 3330 | 1010 | 550 | 1295 | 2950 |
| 1670 I1 | 270 | 251 | 460 | 289 | 213 | 327 | 194 | 175 | 2210 | 4150 | 2400 | 80 | 1480 | 365 | 2020 |
| 2505 J1 | 565 | 584 | 375 | 546 | 622 | 508 | 641 | 660 | 1375 | 3315 | 1565 | 755 | 2315 | 470 | 1185 |
| 1715 K1 | 225 | 206 | 415 | 244 | 168 | 282 | 149 | 130 | 2165 | 4105 | 2355 | 35 | 1525 | 320 | 1975 |
| 790 L1 | 1150 | 1131 | 1340 | 1169 | 1093 | 1207 | 1074 | 1055 | 3090 | 5030 | 3280 | 960 | 600 | 1245 | 2900 |
| 45 M1 | 1895 | 1876 | 2085 | 1914 | 1838 | 1952 | 1819 | 1800 | 3835 | 5775 | 4025 | 1705 | 145 | 1990 | 3645 |
| 857.5 N1 | 1082.5 | 1063.5 | 1272.5 | 1101.5 | 1025.5 | 1139.5 | 1006.5 | 987.5 | 3022.5 | 4962.5 | 3212.5 | 892.5 | 667.5 | 1177.5 | 2832.5 |
| 1625 O1 | 315 | 196 | 505 | 334 | 258 | 372 | 239 | 2220 | 2255 | 4195 | 2445 | 125 | 1435 | 410 | 2065 |

FIG. 9

|  | FREQUENCY (MHz) | SIGNAL LEVEL (dBm) |
|---|---|---|
| A1 | 835 | |
| B1 | 825 | |
| ⋮ | | |
| A2+A1 | 2775 | |
| ⋮ | | |
| A2-A1 | 1105 | |
| ⋮ | | |
| O2-O1 | 2065 | |

WIRELESS COMMUNICATION DEVICE, WIRELESS COMMUNICATION METHOD, AND WIRELESS COMMUNICATION SYSTEM

CROSS-REFERENCE TO RELATED APPLICATION

This application is based upon and claims the benefit of priority of the prior Japanese Patent Application No. 2012-241698, filed on Nov. 1, 2012, the entire contents of which are incorporated herein by reference.

FIELD

The embodiment discussed herein is related to a wireless communication device, a wireless communication method and a wireless communication system.

BACKGROUND

A throughput of 1 Gbps can be reached with LTE-Advanced technology, which includes a carrier aggregation (CA) technique. In the LTE, frequency bands are numbered and designated as BAND1, BAND2, and so on. For instance, BAND1 corresponds to the 2 GHz band (uplink 1920 to 1980 MHz, downlink 2110 to 2170 MHz). As another example, BAND5 corresponds to the 800 MHz band (uplink 824 to 849 MHz, downlink 869 to 894 MHz). Each frequency band is allocated to a country, a region, and a carrier.

Related techniques are disclosed in Japanese Laid-open Patent Publication Nos. 2002-317942 and 2004-288201.

SUMMARY

According to one aspect of the embodiments, a wireless communication device includes: a first generator configured to generate a first signal having characteristics inverse to a first spurious emission that is expected between signals in a plurality of frequency bands during data transmission using the plurality of frequency bands, based on information regarding the plurality of frequency bands; and a plurality of adders configured to add the first signal to a signal in the plurality of frequency bands.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of network parameter information;
FIG. 7 illustrates examples of spurious emission frequencies;
FIGS. 8A and 8B illustrate an example of spurious emission frequencies;
FIG. 9 illustrates an example of a cancellation signal level table.

DESCRIPTION OF EMBODIMENT

In CA, communication is performed using multiple frequency bands that are grouped into units called component carriers (CCs). The bandwidth of CCs may be selected from 1.4 MHz, 3 MHz, 5 MHz, 10 MHz, 15 MHz, and 20 MHz, which are supported in LTE Release 8. CA is effective when it is not possible to reserve a continuous wide band, such as 100 MHz, as a communication frequency band. A maximum of five CCs may be combined.

For example, communication using a combination of five CCs each having a bandwidth of 20 MHz supports a wide transmission band of up to 100 MHz. Through the use of CA, LTE-Advanced may possibly achieve high-speed transmission with a maximum of 1 Gbps.

In CA, frequency combinations for CCs are classified into the following three types:
(1) Intra-band contiguous CA;
(2) Inter-band noncontiguous CA; and
(3) Intra-band noncontiguous CA.

(1) Intra-band contiguous CA is a scheme to combine neighboring CCs within the same frequency band. (2) Inter-band noncontiguous CA is a scheme to combine CCs that are located in different frequency bands. (3) Intra-band noncontiguous CA is a scheme to combine non-neighboring CCs within the same frequency band.

For example, in (2) Inter-band noncontiguous CA, communication in a bandwidth of 35 MHz may be performed using CC1 which has a bandwidth of 20 MHz in the 2 GHz band (BAND1) and CC2 which has a bandwidth of 15 MHz in the 800 MHz band (BAND5).

In (2) Inter-band noncontiguous CA, CCs from different frequency bands are used. When frequency bands are different, carriers have different characteristics and the propagation environment is affected in a different manner, for example, so communication may be performed with stable quality.

Radio waves adhering to radio frequency (RF) performance requirements defined by the 3rd Generation Partnership Project (3GPP) standard or the Radio Act of Japan are used. RF performance requirements include adjacent channel leakage ratio (ACLR), spectrum emission mask (SEM), and spurious emissions, for example.

When a portable terminal emits a radio wave, for example, non-linear distortion may occur in the operating frequency range of an amplifier, a mixer, or the like. A non-linear distortion component includes third-order intermodulation distortion, for example. Any spurious emission signal generated by a non-linear distortion component in the frequency band of an intended signal might become a disturbance wave. Non-linear distortion components include second-order intermodulation distortion, $\frac{1}{2}$ intermediate frequency (IF) distortion, distortion caused by saturation of a power amplifier, and spurious emission that occurs with harmonic components or the like.

Figure 1:
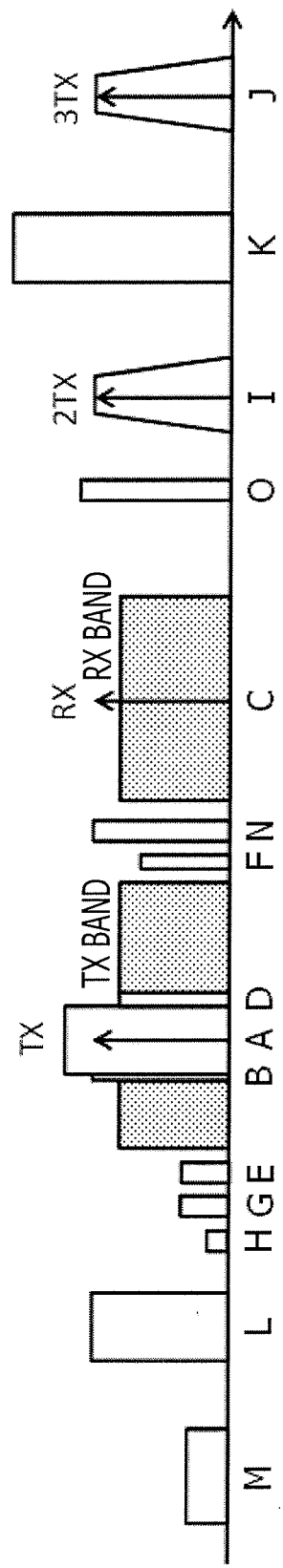
FIG. 1 illustrates an example of spurious emission.
Figure 2:
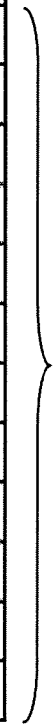
FIG. 2 illustrates an example of spurious emission frequencies.

FIG. 1 illustrates an example of spurious emissions. Spurious emissions occur when a radio wave is emitted using the 2 GHz band (BAND1). FIG. 2 illustrates an example of spurious emission frequencies. FIG. 2 illustrates the frequencies of spurious emissions that occur when a radio wave is emitted using the 2 GHz band (BAND1). The spurious emissions in FIG. 1 may be spurious emissions that occurs in multiples of a transmit channel frequency and a receive channel frequency, second-order intermodulation distortion, or ½ IF distortion, for example. Spurious emissions may be removed by, for example, a filter for removing out-of-band noise.

In CA that uses multiple CCs from different frequency bands, spurious emission caused by interference between CCs might occur in addition to spurious emission that is expected to occur with a single CC.

Figure 3:
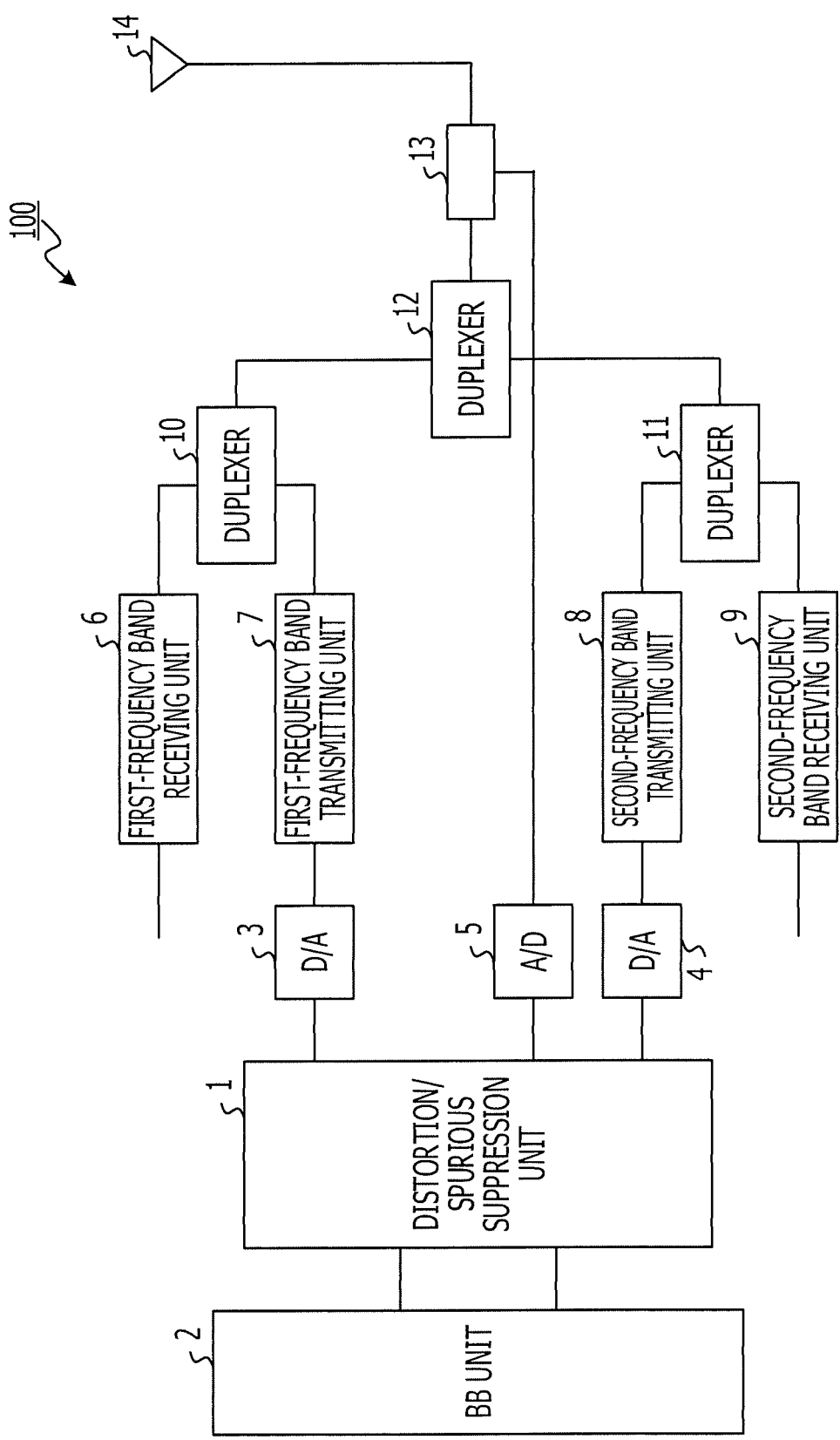
FIG. 3 illustrates an example of a wireless communication device.

FIG. 3 illustrates an example of a wireless communication device. The wireless communication device of FIG. 3 supports LTE-Advanced and performs transmission on the basis of CA. The wireless communication device includes a radio unit (receiving units and transmitting units) for each CC. The wireless communication device may perform CA transmission by using two CCs—one CC in a first frequency band and one CC in a second frequency band. The first frequency band may be the 800 MHz band (BAND5, CC1) and the second frequency band may be the 2 GHz band (BAND1, CC2).

The wireless communication device 100 may be a terminal device such as a portable telephone terminal, smart phone, portable tablet terminal, a base station small remote device, or a radio unit incorporated in a base station device, for example. The wireless communication device 100 generates a cancellation signal for cancelling expected spurious emission by combining signals from two CCs, and adds the cancellation signal to the transmission signals for the CCs. This may reduce spurious emissions associated with CA in the wireless communication device 100. At the start of transmission, the cancellation signal may be generated by referencing a cancellation signal level table, which is created from network parameters. After transmission has started, the cancellation signal may be generated by feeding back spurious emission components from the output signal.

The wireless communication device 100 includes a distortion/spurious emission suppression unit 1, a baseband (BB) unit 2, digital-to-analog conversion/radio frequency (RF) signal conversion units (D/A) 3, 4, an analog-to-digital conversion/BB signal conversion unit (A/D) 5, a first-frequency band receiving unit 6, a first-frequency band transmitting unit 7, a second-frequency band transmitting unit 8, a second-frequency band receiving unit 9, duplexers 10, 11, a diplexer 12, a directional coupler 13, and an antenna 14. The first-frequency band receiving unit 6 and the first-frequency band transmitting unit 7 may be radio units for processing wireless signals of the 800 MHz band (BAND5). The second-frequency band transmitting unit 8 and the second-frequency band receiving unit 9 may be radio units for processing wireless signals of the 2 GHz band (BAND1). FIG. 3 omits functional blocks responsible for receiving-end processing other than the first-frequency band receiving unit 6 and the second-frequency band receiving unit 9. The processing units included in the wireless communication device 100 may each include an IC chip or an electronic circuit that uses electronic components. Processing by the processing units of the wireless communication device 100 may be implemented through software processing carried out by execution of programs by a processor.

The baseband unit 2 modulates a transmission signal (digital signal) into a baseband signal. The baseband unit 2 demodulates a baseband signal into a received signal (digital signal). For example, the modulation scheme may be orthogonal frequency division multiple access (OFDMA). The baseband unit 2 performs error-correcting encoding or decoding on digital signals. The baseband unit 2 processes digital signals per frequency band, for example, separately for the 2 GHz and 800 MHz bands. Although FIG. 3 depicts only one baseband unit 2, the baseband unit 2 may be provided for each frequency band. The baseband unit 2 outputs an I component and a Q component for a signal from each of the 2 GHz and 800 MHz bands. For the sake of simplicity, FIG. 3 does not distinguish between I and Q components but collectively handles them as a "transmission signal". The wireless communication device 100 is provided with separate processing units for the I component and Q component for each band. For the sake of simplicity, however, FIG. 3 illustrates single processing units for signals of each of the two bands.

The transmission signal output by the baseband unit 2 is input to the digital-to-analog conversion/RF signal conversion units 3, 4. The digital-to-analog conversion/RF signal conversion units 3, 4 convert the transmission signal from a digital signal to an analog signal, and modulate it from the baseband signal to a radio frequency using orthogonal transformation or the like. The digital-to-analog conversion/RF signal conversion unit 3 converts the signal into a signal with a radio frequency in the 800 MHz band. The digital-to-analog conversion/RF signal conversion unit 4 converts the transmission signal into a signal with a radio frequency in the 2 GHz band. The transmission signals output from the digital-to-analog conversion/RF signal conversion units 3, 4 are supplied to the first-frequency band transmitting unit 7 and the second-frequency band transmitting unit 8, respectively.

The first-frequency band transmitting unit 7 and the second-frequency band transmitting unit 8 each include a power amplifier, for example, in which the transmission signals are amplified so as to be able to reach the recipient. The first-frequency band receiving unit 6 and the second-frequency band receiving unit 9 amplify received signals.

The duplexer 10 switches between the first-frequency band receiving unit 6 and the first-frequency band transmitting unit 7, and the duplexer 11 switches between the second-frequency band transmitting unit 8 and the second-frequency band receiving unit 9. The diplexer 12 separates signals into 800-MHz and 2-GHz band signals.

The antenna 14 transmits and receives radio waves. For example, when transmitting a wireless signal, the antenna 14 converts an electrical signal input from the diplexer 12 into an electromagnetic wave. When receiving a wireless signal, the antenna 14 receives an electromagnetic wave, converts the electromagnetic wave into an electrical signal, and outputs the electrical signal to the diplexer 12.

The directional coupler 13 diverts a part of the signal output from the diplexer 12 to the analog-to-digital conversion/BB signal conversion unit 5 as feedback. The analog-to-digital conversion/BB signal conversion unit 5 demodulates the feedback signal from the diplexer 12 from a radio frequency signal to a baseband signal, and also converts it from an analog signal to a digital signal. Since demodulation is performed using a 2-GHz band frequency and a 800-MHz band frequency, respectively, the feedback signal is split into a signal to be added to the transmission signal of the 2 GHz band and a signal to be added to the transmission signal of the 800 MHz band. The signal output from the diplexer 12 is thus fed back to the distortion/spurious emission suppression unit 1. The signal fed back may be used as a cancellation signal. The directional coupler 13 may correspond to an acquisition unit.

Figure 4:
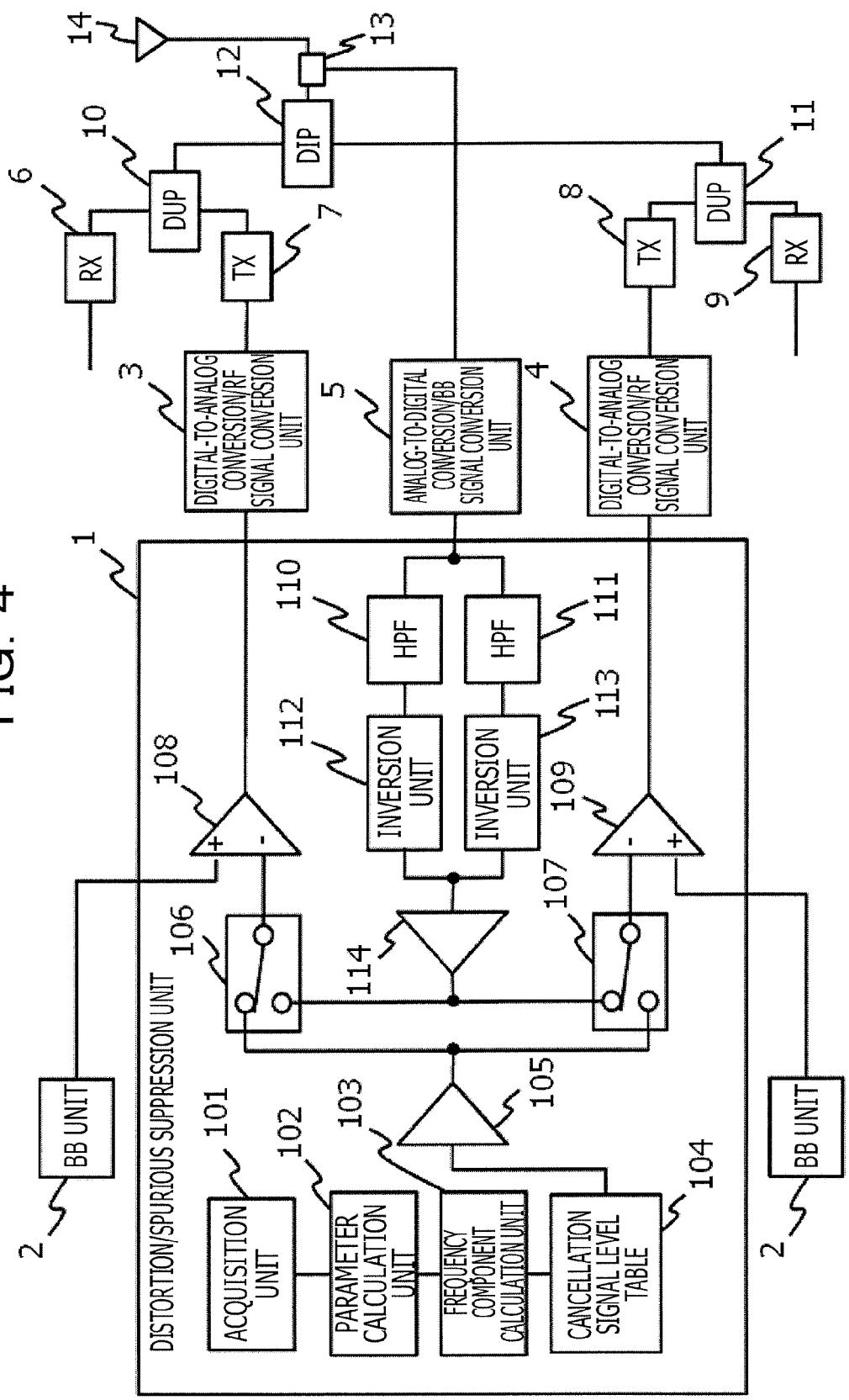
FIG. 4 illustrates an example of a distortion/spurious emission suppression unit.

FIG. 4 illustrates an example of a distortion/spurious emission suppression unit. The distortion/spurious emission suppression unit 1 generates cancellation signals for cancelling spurious emissions caused by the use of the first and second frequency bands, and adds the cancellation signal to the transmission signal.

The distortion/spurious emission suppression unit 1 includes an acquisition unit 101, a parameter calculation unit 102, a frequency component calculation unit 103, a cancellation signal level table 104, a first cancellation signal generation unit 105, switches 106, 107, addition units 108, 109, high-pass filters (HPF) 110, 111, inversion units 112, 113, and a second cancellation signal generation unit 114.

Input of a transmission signal from the BB unit 2 may take place at given intervals, for example. The acquisition unit 101, parameter calculation unit 102, frequency component calculation unit 103, cancellation signal level table 104, and first cancellation signal generation unit 105 generate a cancellation signal at the start of transmission, for example, when the transmission signal is initially input. The high-pass filters (HPF) 110, 111, inversion units 112, 113, and second cancellation signal generation unit 114 generate a cancellation signal after transmission starts, for example, at the second or subsequent input of the transmission signal, based on the feedback signal from the diplexer 12.

The acquisition unit 101 obtains network parameter information from a communication application, for example. The network parameter information may be information relating to frequency bands used for data transmission. For example, if the wireless communication device 100 is a radio unit incorporated in a portable telephone terminal, network parameter information is sent from a base station to the portable telephone terminal when the portable telephone terminal makes a request for communication to the base station. The wireless communication device 100 obtains network parameter information from the communication application in the portable telephone terminal. For example, if the wireless communication device 100 is a radio unit incorporated in a base station, network parameter information is obtained from a processing unit or an application that allocates frequency bands to terminals served by the base station.

The parameter calculation unit 102 calculates a frequency range for use in transmission based on the network parameter information obtained by the acquisition unit 101. The frequency component calculation unit 103 calculates the frequencies of expected spurious emissions based on the network parameter information and creates the cancellation signal level table 104. The cancellation signal level table 104 stores the frequencies of expected spurious emission and the levels (power) of cancellation signals. The parameter calculation unit 102 may correspond to a calculation unit.

The first cancellation signal generation unit 105 generates cancellation signals based on the cancellation signal level table 104. The cancellation signal level table 104 stores levels (voltages) for different spurious emission frequencies. A cancellation signal generated based on the cancellation signal level table 104 is a frequency-domain signal. The first cancellation signal generation unit 105 converts the generated cancellation signal from a frequency-domain to time-domain signal by using, for example, an inverse fast Fourier transform (IFFT). The generated cancellation signal is output to the switch 106 and switch 107. The first cancellation signal generation unit 105 may correspond to a generation unit.

The cancellation signal generated by the first cancellation signal generation unit 105 is added to the transmission signal at the start of transmission, for example, to the first transmission signal that is input from the BB unit 2. When the transmission signal is input for the first time, there is no output signal from the diplexer 12 that is available for feedback. Accordingly, by generating a cancellation signal based on the cancellation signal level table 104 created in advance, spurious emissions may be possibly reduced from the time of the initial transmission of the transmission signal.

The high-pass filter 110 and inversion unit 112 process signals in the first frequency band (800 MHz band). The high-pass filter 111 and inversion unit 113 process signals in the second frequency band (2 GHz band).

Feedback signals for the first frequency band (800 MHz band) and the second frequency band (2 GHz band) from the diplexer 12 are respectively input to the high-pass filters 110, 111 via the analog-to-digital conversion/BB signal conversion unit 5. The high-pass filters 110 and 111 remove the transmission signal from the feedback signal. After removal of the transmission signal, the feedback signal contains spurious emissions or distortion components that have been introduced in the digital-to-analog conversion/RF signal conversion units 3, 4, first-frequency band transmitting unit 7, second-frequency band transmitting unit 8, and/or the diplexer 12. The inversion units 112 and 113 each generate a cancellation signal by respectively inverting the level of the signal in the first frequency band (800 MHz band) and the signal in the second frequency band (2 GHz band), from both of which the transmission signal has been removed. The cancellation signals for the two bands are output to the switches 106 and 107 respectively via the second cancellation signal generation unit 114. The second cancellation signal generation unit 114 may correspond to a second generation unit.

The switches 106 and 107 respectively switch the cancellation signal input path to the addition units 108 and 109 between the first cancellation signal generation unit 105 and the second cancellation signal generation unit 114. At the start of transmission, for example, when the transmission signal is input from the BB unit 2 for the first time, the switches 106 and 107 couple the cancellation signal input path to the addition units 108 and 109 with the first cancellation signal generation unit 105. After transmission has started, for example, at the second or subsequent input of the transmission signal from the BB unit 2, the switches 106, 107 couple the cancellation signal input path to the addition units 108, 109 with the second cancellation signal generation unit 114. The switches 106 and 107 may correspond to switching units.

The addition units 108 and 109 respectively add the cancellation signal to the transmission signal in the first frequency band (800 MHz band) and the transmission signal in the second frequency band (2 GHz band). The resulting signals from the addition units 108 and 109 are output to the digital-to-analog conversion/RF signal conversion units 3 and 4, respectively.

Figure 5A:
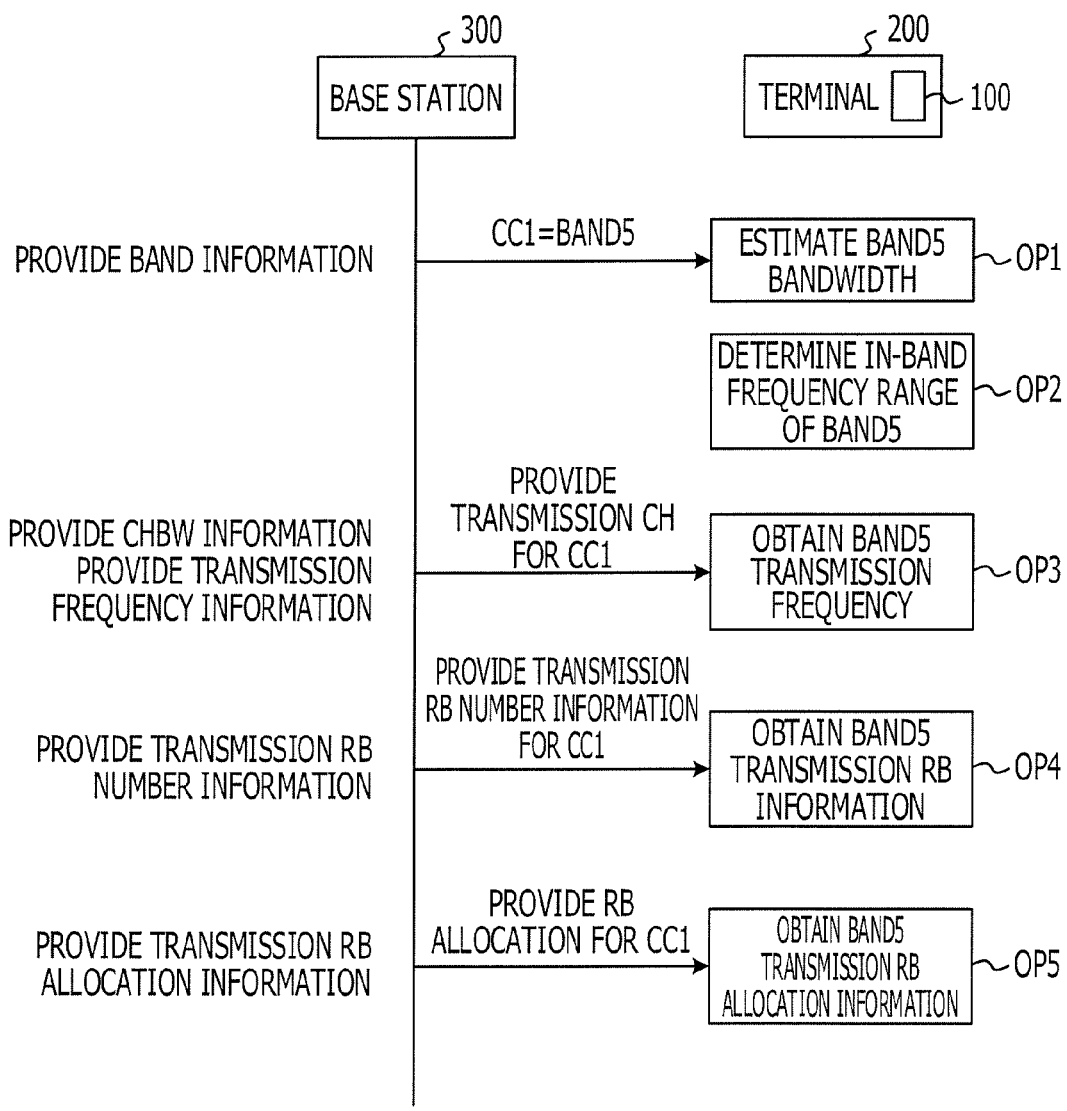
FIG. 5A illustrates an example of an information provision sequence.

FIG. 5A illustrates an example of an information provision sequence. When the wireless communication device 100 is incorporated in a portable telephone terminal 200, network parameter information is provided from a base station 300 in accordance with the provision sequence illustrated in FIG. 5A. FIGS. 5B, 5C, 5D, and 5E illustrate an example of an identification of a transmission band. The transmission band used is identified from network parameter information. Network parameter information may be provided in response to the portable telephone terminal 200 sending a communication request to the base station 300, for example.

The base station 300 provides the portable telephone terminal 200 with band information, CHBW information, transmission frequency information, transmission resource block information, or transmission resource block allocation information, for example.

Figure 5B:
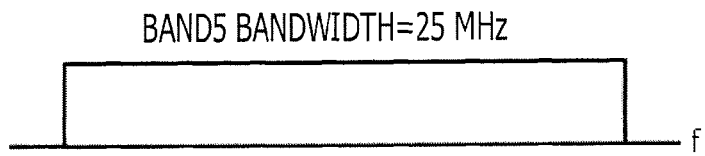
FIGS. 5B, 5C, 5D, and 5E illustrate an example of an identification of a transmission band.
Figure 5C:
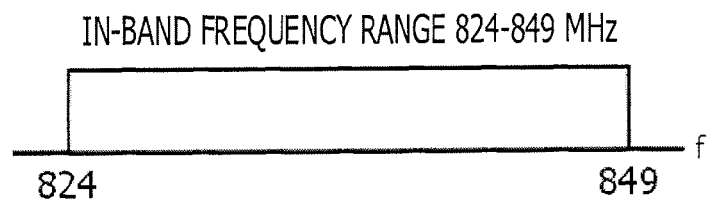

The band information includes the frequency band of a CC and an in-band frequency range. Based on the band information, the parameter calculation unit 102 of the wireless communication device 100 estimates the bandwidth of a frequency band (OP1), and determines the in-band frequency range (OP2). For example, when band information indicates that CC1's frequency band is BAND5 and its in-band frequency range is 824 to 849 MHz, the frequency band in which CC1 is to be positioned is estimated to be BAND5 through the estimation of frequency band bandwidth in OP1, as illustrated in FIG. 5B. By determination of the in-band frequency range in OP2, the in-band frequency range in which CC1 is to be positioned is determined to be 824 to 849 MHz, as illustrated in FIG. 5C.

Figure 5D:
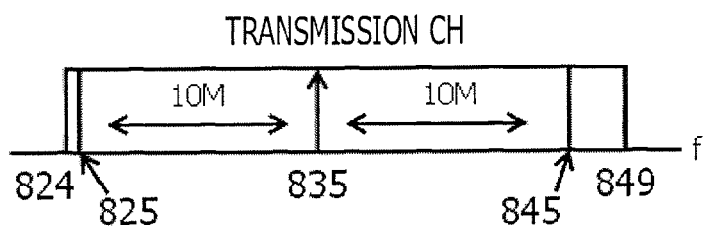

The transmission frequency information includes the CC bandwidth (CHBW) and the transmit channel frequency. For CC bandwidth, one of 1.4 MHz, 3 MHz, 5 MHz, 10 MHz, 15 MHz, and 20 MHz is designated. The parameter calculation unit 102 obtains the transmission frequency based on transmission frequency information (OP3). The parameter calculation unit 102 obtains the transmission frequency and CHBW to thereby obtain the frequency range of CC1. When transmission frequency information includes CHBW of 20 MHz and a transmission channel frequency of 835 MHz, for example, the range of CC1 is determined to be 20 MHz wide around 835 MHz, from 825 to 845 MHz for example, as illustrated in FIG. 5D.

The transmission resource block number information includes the number of resource blocks to be allocated to the portable telephone terminal 200. The transmission resource block allocation information includes block numbers for resource blocks to be allocated to the portable telephone terminal 200. A resource block is a unit of frequency for allocation to users. With LTE, when the modulation scheme used is OFDMA, twelve subcarriers neighboring at intervals of 15 kHz (15 kHz×12=180 kHz) are defined as one resource block. LTE also specifies that a CC of 20 MHz is divided into 100 resource blocks. Resource blocks are assigned numbers starting from 0 corresponding to frequency in ascending order.

Figure 5E:
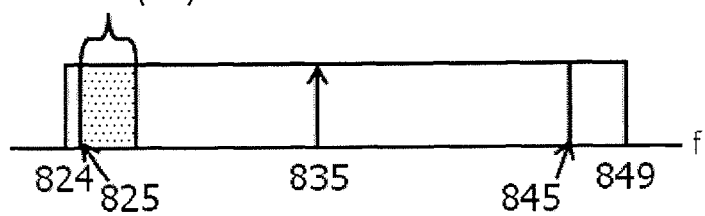

The parameter calculation unit 102 obtains the number of resource blocks to use for transmission based on transmission resource block number information (OP4). The parameter calculation unit 102 obtains the numbers of resource blocks to use for transmission based on transmission resource block allocation information (OP5). The parameter calculation unit 102 accordingly derives the frequency range to use for transmission. By way of example, when transmission resource block number information indicates that the number of transmission resource blocks is 8 and the transmission resource block allocation information indicates that transmission resource block numbers are 0 through 7, the parameter calculation unit 102 derives 825 to 826.44 MHz as the frequency range for use in transmission, as illustrated in FIG. 5E. For example, as the transmission resource block numbers are 0 through 7, the lower limit frequency for use in transmission is determined to be 825 MHz. As the number of transmission resource blocks is eight and the transmission resource block numbers are 0 through 7, 180 kHz×8=1.44 MHz is added to 825 MHz; the upper limit frequency for use in transmission is determined to be 826.44 MHz.

FIG. 6 illustrates an example of network parameter information. In FIGS. 5A to 5E, network parameter information is obtained and calculated for CC1. For CC2, network parameter information is obtained and calculated in a similar manner. FIG. 6 illustrates network parameter information. The network information illustrated in FIG. 6 may be information for both CC1 and CC2.

Of the information illustrated in FIG. 6, the acquisition unit 101 retrieves frequency band information, in-band frequency range, transmit channel frequency, CHBW, the number of transmission resource blocks, and allocated transmission resource block numbers. From this information, the parameter calculation unit 102 calculates the low and high transmission frequency ranges.

Based on the information acquired by the acquisition unit 101 and information calculated by the parameter calculation unit 102, the frequency component calculation unit 103 calculates the frequencies of expected spurious emissions.

FIG. 7 illustrates an example of spurious emission frequencies. FIG. 7 illustrates the frequencies of spurious emissions that are expected to occur when a radio wave is emitted using CC1 in the 800 MHz band (BAND5). Frequencies of spurious emission that are expected to occur with CC2 in the 2 GHz band (BAND1) are given in FIG. 2.

TX carrier in A1 represents the transmit channel frequency. The transmit channel frequency is obtained through provision of transmission frequency information from the base station, for example. TX_RB transmission frequency in B1 is the frequency of a radio wave after modulation with the transmission carrier wave (A1). The value of TX_RB transmission frequency in B1 is a value that falls between the low transmission frequency range and the high transmission frequency range calculated by the parameter calculation unit 102. RX carrier in C1 is the receive channel frequency. The receive channel frequency may be determined as a function of the transmit channel frequency. With the 800 MHz band, for example, 869 to 894 MHz is designated as the receiving band for a transmission band of 824 to 849 MHz; so when the transmit channel frequency is 835 MHz, the receive channel frequency may be 880 MHz.

The frequencies of spurious emissions in D1 to O1 are determined based on given formulas once the values of A1 to C1 are determined. Spurious emissions from D1 to O1 may include spurious emissions that appears in multiples of the transmit channel frequency and receive channel frequency, second-order intermodulation distortion, or ½ IF distortion, for example. For example, formulas for calculating G1 through O1 are given in the second field of each row in FIG. 7.

The spurious emissions illustrated in FIGS. 2 and 7 may be spurious emissions that are expected to occur in a single CC of a frequency band. In CA, due to use of multiple CCs, additional spurious emissions are caused by interference between CCs or the like. The frequency component calculation unit 103 also calculates the frequencies of spurious emission components that occur due to interaction between CCs.

FIGS. 8A and 8B illustrate an example of spurious emission frequencies. FIGS. 8A and 8B illustrate the frequencies of spurious emissions that are expected to occur due to interaction between CC1 and CC2. A1 through O1 illustrated in FIGS. 8A and 8B correspond to spurious emission frequencies A1 through O1 for the 800 MHz band (BAND5) in FIG. 7. A2 through O2 illustrated in FIGS. 8A and 8B correspond to the spurious emission frequencies A2 through O2 for the 2 GHz band (BAND1) in FIG. 2.

FIG. 8A illustrates spurious emission frequencies calculated by summing frequencies of spurious emission components for CC1 and CC2. For example, in FIG. 8A, the cell identified by (A1, A2) contains the value of A2+A1. FIG. 8B illustrates spurious emission frequencies calculated as differences between spurious emission frequencies for CC2 and CC1. For example, in FIG. 8B, the cell identified by (A1, A2) contains the value of A2−A1.

The frequency component calculation unit 103 determines the frequencies given in FIGS. 8A and 8B as the frequencies of spurious emission that is expected to occur due to interaction between the CCs, for example. The frequency component calculation unit 103 may also determine the frequencies of other kinds of spurious emissions, for example. When there are three or more CCs, for example, sums and differences may be determined for various combinations, such as combinations of two or three CCs.

FIG. 9 illustrates an example of a cancellation signal level table. For example, the cancellation signal level table 104 contains the frequencies of expected spurious emissions and cancellation signal levels corresponding to the frequencies, which are calculated by the frequency component calculation unit 103. The level of a cancellation signal may be a measured value obtained in advance by simulation or the like, and is a value that gives the cancellation signal characteristics inverse to the expected spurious emission component. It may be difficult to perfectly predict the frequencies at which spurious emission occurs and the levels of the spurious emissions. For this reason, A1 to O1, A2 to O2, and cancellation signal levels for frequencies corresponding to the sums and differences of A1 to O1 and A2 to O2 are not changed when the frequency values of A1 to O1 and A2 to O2 vary. Thus, A1 to O1, A2 to O2, and cancellation signal levels corresponding to combinations of addition and subtraction of A1 to O1 and A2 to O2 are prestored in the cancellation signal level table 104. The frequency component calculation unit 103 writes calculated spurious emission frequencies into the corresponding fields in the cancellation signal level table 104 to create the cancellation signal level table 104.

Figure 10A:
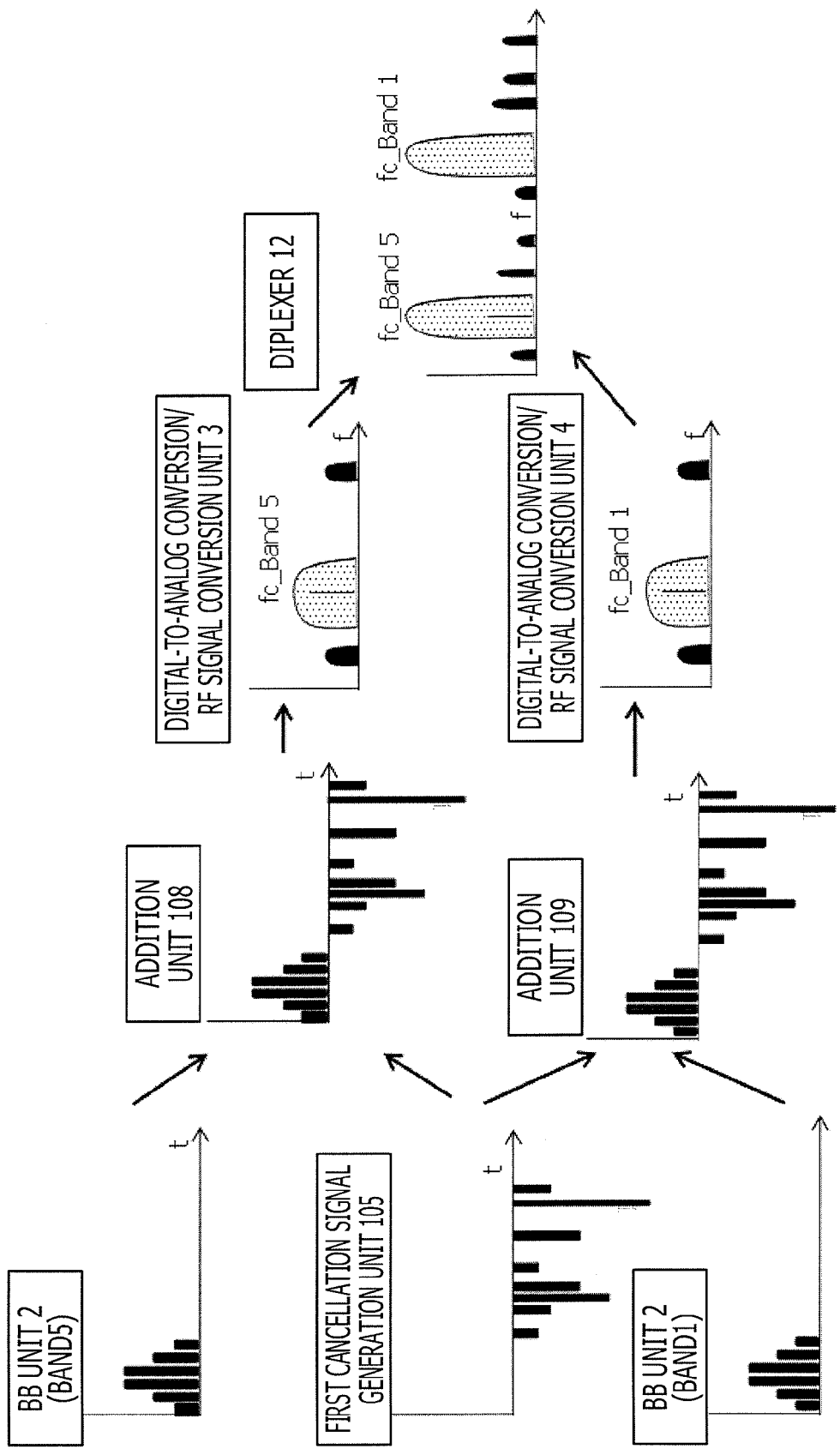
FIGS. 10A to 10C illustrate an example of output signals.
Figure 10B:
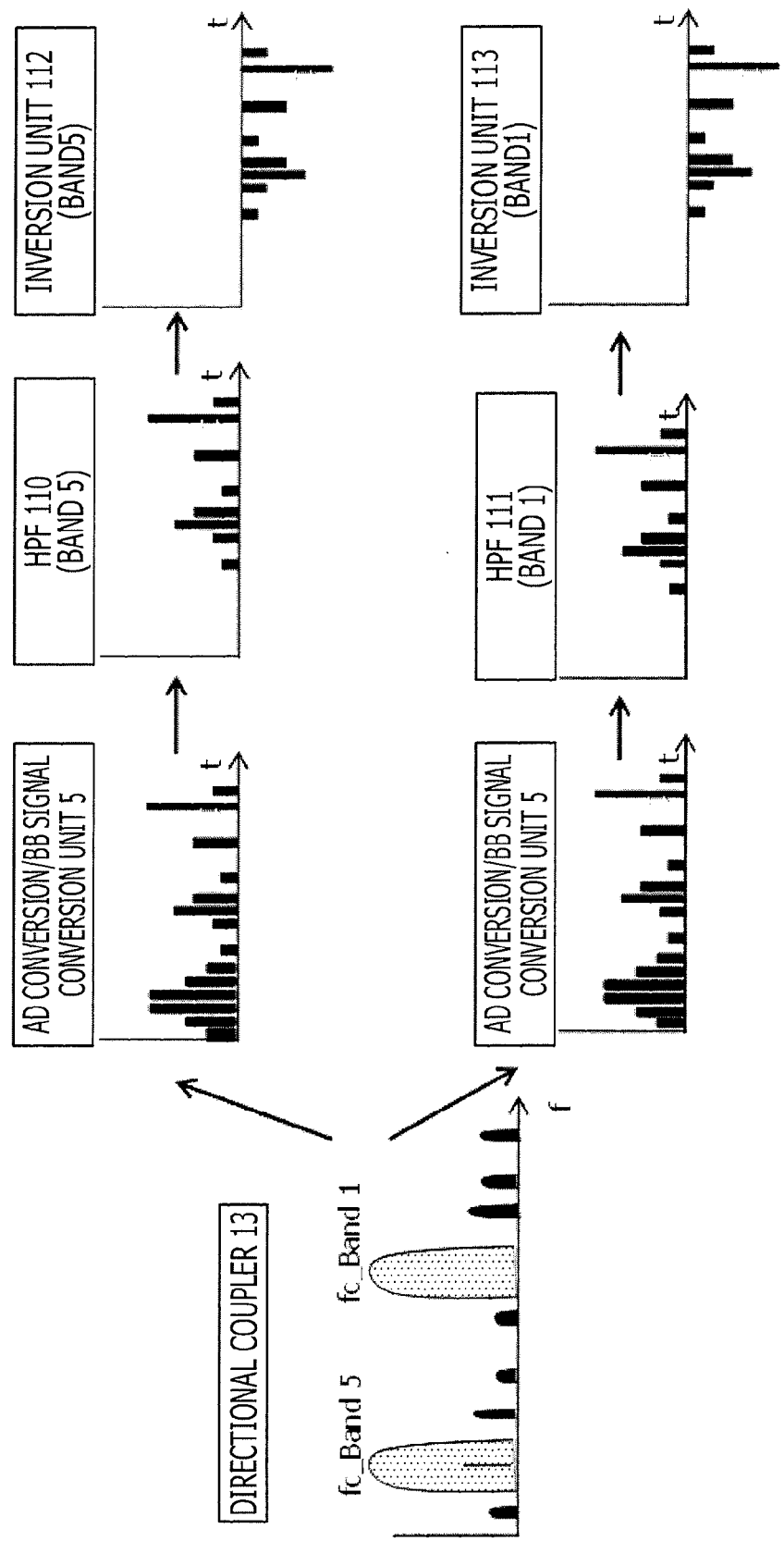
Figure 10C:
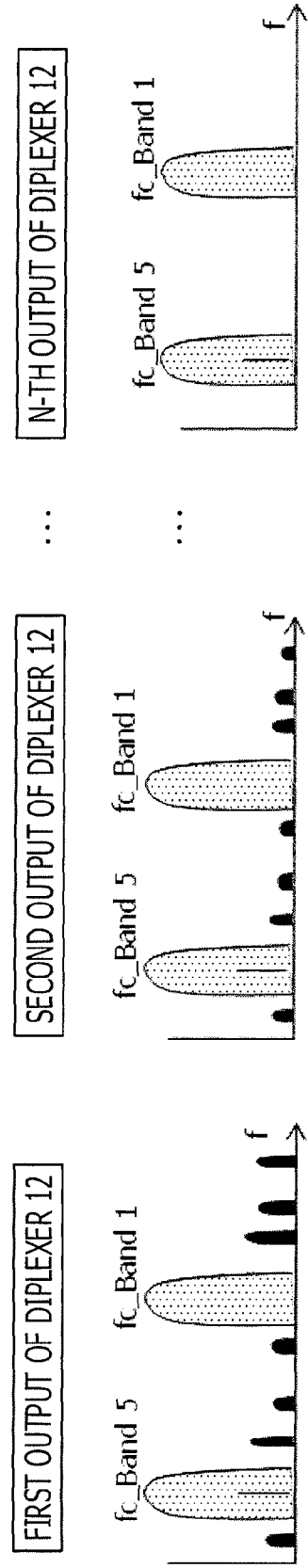

FIGS. 10A, 10B, and 10C illustrate an example of output signals. FIG. 10A illustrates output signals from the processing units depicted in FIG. 3 or FIG. 5A at the initial transmission. FIG. 10A illustrates output signals from the BB unit 2, first cancellation signal generation unit 105, addition units 108, 109, digital-to-analog conversion/RF signal conversion units 3, 4, and diplexer 12. The output signal from the first cancellation signal generation unit 105 is a cancellation signal generated based on the cancellation signal level table 104. In the output signal from the diplexer 12 illustrated in FIG. 10A, the output level of spurious emissions is decreased by the cancellation signal generated by the first cancellation signal generation unit 105. However, spurious emission components may not completely be removed because they vary with temperature, variations in source voltage, or device-to-device variations. The output signal from the diplexer 12 illustrated in FIG. 10A contains spurious emission components that have not been removed. The remaining spurious emission components are fed back, and cancellation signals for the second and subsequent transmission are generated based on the remaining spurious emission components.

FIG. 10B illustrates output signals from various processing units up to generation of a cancellation signal based on the feedback signal from the diplexer 12 which has been fed back from the directional coupler 13. FIG. 10B illustrates output signals from the directional coupler 13, analog-to-digital conversion/BB signal conversion unit 5, high-pass filters 110, 111, and inversion units 112, 113.

The feedback signal from the directional coupler 13 contains transmission signals for the 800 MHz band (BAND5) and the 2 GHz band (BAND1). The feedback signal is split into transmission signals of the two frequency bands at the analog-to-digital conversion/BB signal conversion unit 5 and the transmission signals are input to the high-pass filter 110 and high-pass filter 111, respectively. The high-pass filter 110 and high-pass filter 111 remove the transmission signals in the respective frequency bands so as to extract spurious emission components. The output signals from the high-pass filters 110 and 111 are therefore spurious emission components. The spurious emission components are inverted in the inversion units 112 and 113 and output to the second cancellation signal generation unit 114 as cancellation signals. The cancellation signals are output from the second cancellation signal generation unit 114 and added to the transmission signals in the respective frequency bands at the addition units 108 and 109.

FIG. 10C illustrates the output signal of the diplexer 12. Spurious emission components in the output signal for the initial transmission may be decreased by cancellation signals generated based on the cancellation signal level table 104. Spurious emission components in the output signal for second and subsequent transmissions may be decreased by cancellation signals generated based on the output signal of the diplexer 12 that is fed back. Repeated feedback of the output signal from the diplexer 12 may gradually decrease the level of spurious emission components and reduce spurious emissions during CA transmission.

Although there is no output signal from the diplexer 12 available for feedback when the initial transmission is made, spurious emission components in the initial transmission may possibly be reduced by cancellation signals generated based on the cancellation signal level table 104. Reduction in spurious emission may decrease degradation in characteristics of the transmission signal and improve transmission quality.

The wireless communication device 100 illustrated in FIGS. 1 through 10C may be applied to a portable telephone terminal, a base station small remote device, or a base station device, for example.

Figure 11A:
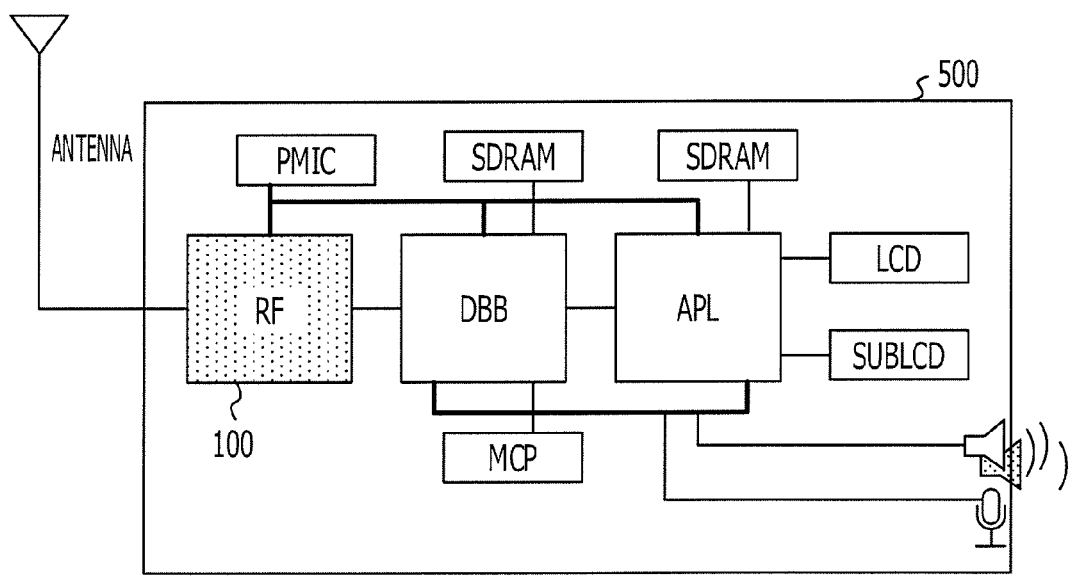
FIG. 11A illustrates an example of a portable telephone terminal.

FIG. 11A illustrates an example of a portable telephone terminal. To a portable telephone terminal 500 illustrated in FIG. 11A, the wireless communication device 100 illustrated in FIGS. 1 to 10C is applied. For example, the wireless communication device 100 is applied to an RF unit that performs radio-related processing in the portable telephone terminal 500. The wireless communication device 100 may also be applied to an LTE-enabled portable terminal device, such as a smart phone or tablet terminal.

Figure 11B:
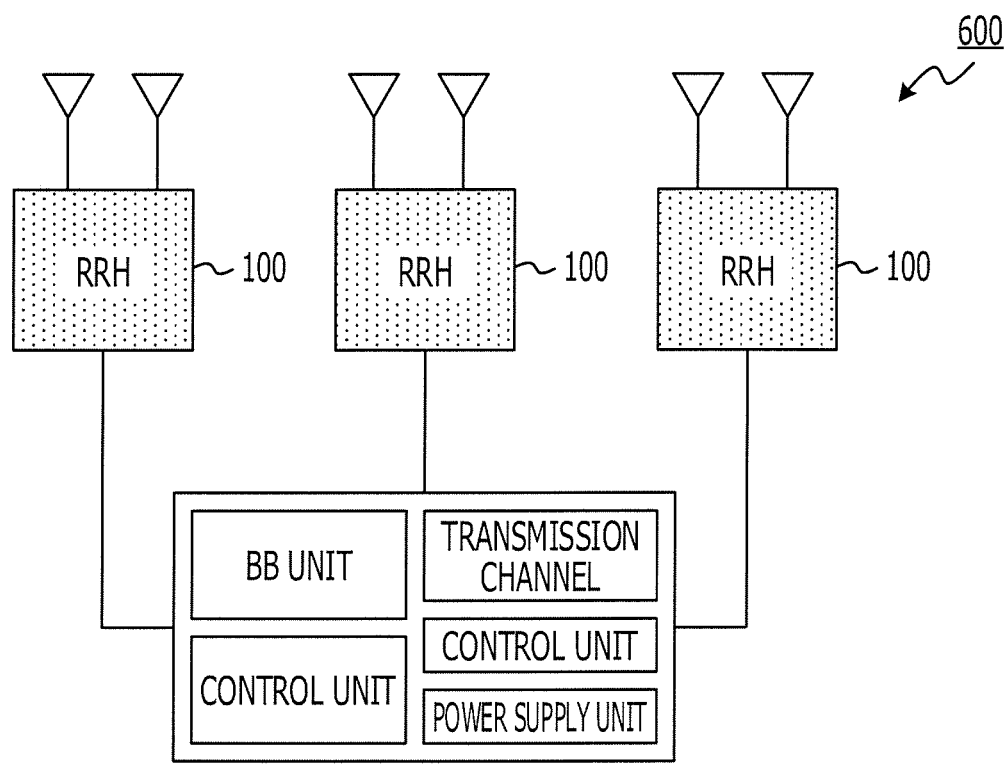
FIG. 11B illustrates an example of a base station small remote device.

FIG. 11B illustrates an example of a base station small remote device. To a base station small remote device 600 illustrated in FIG. 11B, the wireless communication device 100 illustrated in FIGS. 1 to 10C is applied. The wireless communication device 100 is applied to remote radio head (RRH) units, which perform radio-related processing in the base station small remote device 600.

Figure 11C:
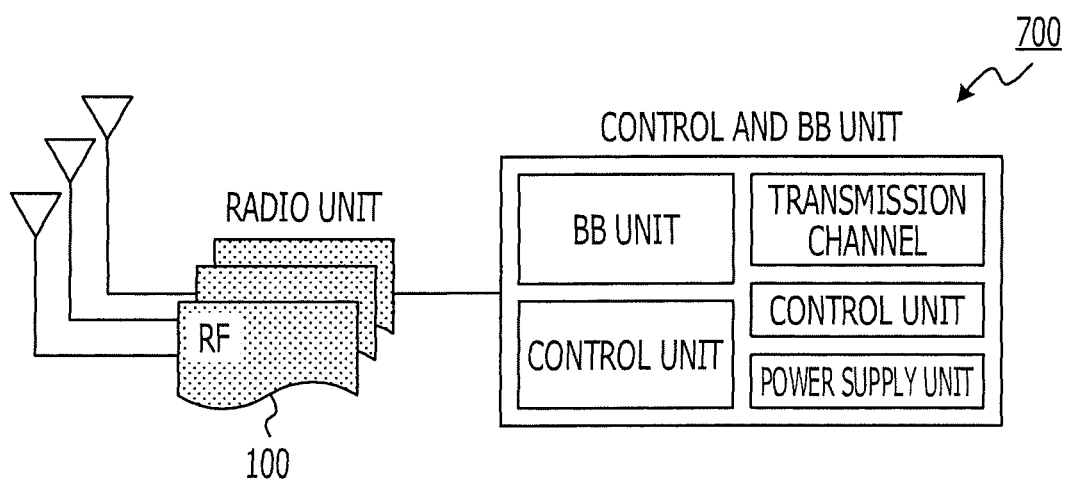
FIG. 11C illustrates an example of a base station device.

FIG. 11C illustrates an example of a base station device. The wireless communication device 100 illustrated in FIGS. 1 to 10C is applied to a base station device 700. The wireless communication device 100 is applied to an RF unit, which performs radio-related processing in the base station device 700.

When the wireless communication device 100 is applied to the base station small remote device 600 or base station device 700 as illustrated in FIGS. 11B and 11C, network parameter information may be maintained in the device itself. Thus, the wireless communication device 100 may obtain network parameter information from a communication application for example, without involving provision of network parameter information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless communication device comprising:
   a first generator configured to generate a first cancellation signal having inverse characteristics of a first spurious emission that is expected to occur between transmission signals in a plurality of frequency bands during data transmission using the plurality of frequency bands, based on information regarding the plurality of frequency bands; and
   a plurality of adders configured to add the first cancellation signal to the transmission signals in the plurality of frequency bands.

2. The wireless communication device according to claim 1, further comprising:
   a calculator configured to calculate, based on the information, the first spurious emission in each frequency band, and calculate, based on the first spurious emission, a second spurious emission that is expected to occur when data transmission is performed using a combination of the frequency bands.

3. The wireless communication device according to claim 2, wherein the calculator is further configured to:
   determine frequencies of expected spurious emissions based on network parameters; and
   determine a table comprising frequencies of expected spurious emissions and power levels of cancellation signals corresponding to the expected spurious emissions.

4. The wireless communication device according to claim 1, wherein the first generator is further configured to obtain the first cancellation signal based on a table including information on frequencies of spurious emissions and corresponding cancellation signals.

5. The wireless communication device according to claim 4, further comprising:
   a plurality of switches configured to:
   couple the first generator with the plurality of adders when a first data transmission starts, and
   couple the second generator with the plurality of adders after the first data transmission.

6. The wireless communication device according to claim 1, further comprising:
   an acquisition unit configured to acquire, as a feedback signal, an output signal to be transmitted via an antenna, the output signal including the transmission signals in the plurality of frequency bands; and
   a second generator configured to generate a second cancellation signal having inverse characteristics of a spurious emission component contained in the feedback signal, wherein the plurality of adders respectively add the second cancellation signal to the transmission signals in the plurality of frequency bands.

7. The wireless communication device according to claim 6, wherein the second generator includes:
   a separator configured to separate signals in the frequency bands contained in the feedback signal;
   a plurality of filters configured to remove the transmission signals from the separated signals; and
   a plurality of inverters configured to respectively invert the power of filtered signals output from the plurality of filters.

8. The wireless communication device according to claim 1, wherein the wireless communication device is adapted to support a carrier aggregation technology configured to operate in the plurality of frequency bands.

9. The wireless communication device according to claim 8, wherein the transmission signals comprise carrier components in the plurality of frequency bands.

10. The wireless communication device according to claim 1, wherein the first spurious emission comprises spurious emissions that are expected to occur due to interferences between the transmission signals in the plurality of frequency bands.

11. A wireless communication method, comprising:
    generating, by a wireless communication device, a first cancellation signal having inverse characteristics of a spurious emission that is expected to occur between transmission signals in a plurality of frequency bands during data transmission using the plurality of frequency bands, based on information regarding the plurality of frequency bands used for data transmission; and
    adding the first cancellation signal to the transmission signals in the plurality of frequency bands.

12. The wireless communication method according to claim 11, further comprising:
    receiving an output signal to be transmitted via an antenna, as a feedback signal, the output signal including the transmission signals in the plurality of frequency bands; and
    generating a second cancellation signal having inverse characteristics of a spurious emission component contained in the feedback signal.

13. The wireless communication method according to claim 12, further comprising,
    performing wireless communication using the first cancellation signal when a first data transmission starts and using the second cancellation signal after the first data transmission.

14. A wireless communication system comprising:
    an antenna configured to transmit signals;
    a generator configured to generate a first cancellation signal having inverse characteristics of a spurious emission that is expected to occur between transmission signals in a plurality of frequency bands during data transmission using the plurality of frequency bands, based on information regarding the plurality of frequency bands used for transmission of the data; and
    a plurality of adders configured to add the first cancellation signal to the transmission signals in the plurality of frequency bands.

* * * * *